US008649001B2

(12) United States Patent
Wu et al.

(10) Patent No.: US 8,649,001 B2
(45) Date of Patent: Feb. 11, 2014

(54) SUBSTRATE FOR FINGERPRINT CONTACT

(75) Inventors: Chien-Hsing Wu, Kaohsiung (TW);
Jung-Tsung Chou, Hsinchu County (TW)

(73) Assignee: Gingy Technology Inc., Hsinchu (TW)

( * ) Notice: Subject to any disclaimer, the term of this patent is extended or adjusted under 35 U.S.C. 154(b) by 88 days.

(21) Appl. No.: 13/371,814

(22) Filed: Feb. 13, 2012

(65) Prior Publication Data
US 2013/0051635 A1 Feb. 28, 2013

(30) Foreign Application Priority Data
Aug. 24, 2011 (TW) .............................. 100130376 A

(51) Int. Cl.
*G06K 9/74* (2006.01)
*G06K 9/00* (2006.01)
(52) U.S. Cl.
CPC ................................ *G06K 9/00046* (2013.01)
USPC ............................................................. 356/71
(58) Field of Classification Search
CPC ........................................................ G06K 9/74
USPC ............................................................. 356/71
See application file for complete search history.

(56) References Cited

U.S. PATENT DOCUMENTS

| 4,336,998 | A | * | 6/1982 | Ruell | 356/71 |
| 4,358,677 | A | * | 11/1982 | Ruell et al. | 250/216 |
| 5,736,734 | A | * | 4/1998 | Marcus et al. | 250/225 |
| 5,812,252 | A | * | 9/1998 | Bowker et al. | 356/71 |
| 6,069,969 | A | * | 5/2000 | Keagy et al. | 382/124 |
| 7,728,959 | B2 | * | 6/2010 | Waldman et al. | 356/71 |
| 7,787,110 | B2 | * | 8/2010 | Raguin et al. | 356/71 |
| 2005/0105078 | A1 | * | 5/2005 | Carver et al. | 356/71 |
| 2006/0119837 | A1 | * | 6/2006 | Raguin et al. | 356/71 |
| 2006/0170906 | A1 | * | 8/2006 | Arnold et al. | 356/71 |

* cited by examiner

*Primary Examiner* — Michael P Stafira
(74) *Attorney, Agent, or Firm* — Morris Manning & Martin LLP; Tim Tingkang Xia, Esq.

(57) ABSTRACT

A substrate for fingerprint contact includes a plate, and the plate includes a first surface and a second surface. The first surface is an optical diffusing surface. The optical diffusing surface is used for being contacted by a finger, and features hazed particles. The second surface faces an optical imaging system. The optical diffusing surface of the plate helps to enhance light to be evenly emitted to the finger and weakens the unnecessary scattered light to the optical imaging system, so as to enhance the recognition rate of a fingerprint when the optical imaging system is used for intercept the light applied on a finger.

8 Claims, 4 Drawing Sheets

SUBSTRATE FOR FINGERPRINT CONTACT

CROSS-REFERENCE TO RELATED APPLICATIONS

This non-provisional application claims priority under 35 U.S.C. §119(a) on Patent Application No(s). 100130376 filed in Taiwan, R.O.C. on Aug. 24, 2011, the entire contents of which are hereby incorporated by reference.

BACKGROUND

1. Technical Field

The present disclosure relates to a substrate, and more particularly to a substrate for fingerprint contact.

2. Related Art

Identity recognition plays an important role as a goalkeeper in the state security, enterprise information management and home security. Biometrics identifies and confirms the identity of a person according to specific physiological characteristics. Generally, biometrics mainly consists of recognition through voice, face, iris, vein, and fingerprint at present. Fingerprints are made up of many rough and uneven ridges and valleys. The fingerprints of each person are unique, a faint possibility exists that different persons have identical fingerprints, and the fingerprints are not likely to change as the age increases or health condition changes. Therefore, compared with other methods, fingerprint recognition is an easy and low-cost technology most widely used.

Conventional fingerprint recognition systems are mainly classified into optical, capacitive, ultrasonic, and thermal sensing fingerprint recognition systems. Briefly, an optical fingerprint recognition system acquires a greyscale digital image of the ridges and valleys of the finger by using an array including many Charge Coupled Devices (CCDs) through optical scanning. A capacitive fingerprint recognition system includes a sensing chip of a metal array. A surface of the chip is wrapped in an insulation layer. When a finger is placed on the sensing chip, different sensing capacitances appear, because the distance between a surface of the insulation layer and the metal array changes due to the ridges and valleys of the fingerprint. In an ultrasonic fingerprint recognition system, an ultrasonic signal is first transmitted into a finger, and then a pattern of the fingerprint is read from a reflected signal. When a corium laminar with high conductivity is detected in the ultrasonic signal, the ultrasonic signal is reflected to and read by the recognition system. A thermal sensing fingerprint recognition system measures a fingerprint pattern based on different thermal conductivities between an epidermis and the air.

A conventional optical fingerprint recognition system is a totally reflective optical fingerprint recognition system, mainly including an optical component and an optical imaging system. The optical component is used for reflecting and transmitting light through tools such as lenses, prisms and optical fibers, and the optical imaging system is mainly used for capturing an image of the fingerprint. One of the steps for fingerprint recognition is to emit light to the fingerprint of the finger at a preset angle first. Since the fingerprint is made up of the multiple rough, uneven and irregular ridges and valleys, when the finger contacts the optical component, the ridges contact the optical component, and the valleys do not contact the optical component. When the light irradiates the valley, the light is reflected in a chamber of the valley and is then emitted to the optical imaging system. Since the ridge directly contacts the optical component, when the light irradiates the ridge, the light is directly reflected, and is then emitted to the optical imaging system. In contrast to the case that the light irradiates the ridge, the reflected light of the valley generates a bright area, and the ridge generates a dark area, such that the fingerprint produces a clearly alternating bright and dark stripes pattern. According to the principle of optical total reflection, the light transmits the fingerprint to the optical imaging system to acquire an image of the fingerprint, and then the characteristics of each fingerprint are calculated and recorded according to the forms and details of the fingerprint by using an algorithm of the system. In this manner, fingerprint recognition is performed.

For the above-mentioned totally reflective optical fingerprint recognition system, the optical component guides the light to travel according to the principle of total reflection. Therefore, during the assembly of the optical fingerprint recognition system, the light incident angle and emergent angle of the optical component and the optical imaging system must be adjusted accurately, such that the light is effectively guided to be projected to the finger and reflected to the optical imaging system from the finger, and then the optical imaging system intercepts the image of the fingerprint pattern. Therefore, the assembly of the totally reflective optical fingerprint recognition system is difficult and complex, and the cost of the assembly is also high.

In addition, a light emitting element of the totally reflective optical fingerprint recognition system is a point light source, and if the light is not diffused through certain optical processing, the reflected light is likely to become non-uniform, resulting in an unclear image. Therefore, when capturing a fingerprint pattern of the finger, the totally reflective optical fingerprint recognition system may acquire a fuzzy image, resulting in a difficulty in fingerprint recognition.

SUMMARY

Accordingly, the disclosure is a substrate for fingerprint contact, which is used for solving the problems that the assembly of the conventional optical fingerprint recognition system is complex and the image is fuzzy, resulting in a high assembly cost and a difficulty in fingerprint recognition.

In an embodiment of the disclosure, the substrate for fingerprint contact includes a plate, and the plate has a first surface and a second surface. The first surface is opposite to the second surface. The first surface is an optical diffusing surface used for being contacted by a finger, and the second surface faces an optical imaging system.

In an embodiment of the disclosure, the optical diffusing surface is a surface featuring hazed particles formed by a Ultra-Violet Coating (UV Coating) or a mold discharging process, and the haze of the optical diffusing surface approximately ranges from 85% to 95%. When the light is emitted to the finger, the optical diffusing surface helps to enhance the scattering of the light, so the light is evenly emitted to the finger, thus improving the brightness of a valley of the finger. When the light contacts the finger, as a ridge of the finger contacts the optical diffusing surface, the light is reflected back directly. The optical diffusing surface is also capable of weakening unnecessary scattered light to the optical imaging system when contacting the ridge of the finger, other light contacting the valley is reflected and diffused by the finger, and then a clear fingerprint pattern is transmitted to a sensing element of the optical imaging system, thereby enhancing the difference between the brightness and darkness of the fingerprint pattern.

In an embodiment of the disclosure, the substrate for fingerprint contact includes a plate and a film. The plate has a first surface and a second surface. The first surface is opposite to the second surface, and the second surface faces an optical imaging system. The film has an optical diffusing surface. The optical diffusing surface of the film is attached to the first surface of the plate so the optical diffusing surface is located between the plate and the film, and another surface of the film far away from the optical diffusing surface is used for being contacted by a finger.

In an embodiment of the disclosure, the above-mentioned film features hazed particles formed by the UV Coating or the mold discharging process, and the haze of the film approximately ranges from 85% to 95%. When light is emitted to the finger, the optical diffusing surface of the film helps to enhance the scattering of the light to make the light evenly emitted to the finger, thereby improving the brightness of the light. When the light contacts the finger, as a ridge of the finger contacts the optical diffusing surface, the light is reflected back directly, and the optical diffusing surface of the film is capable of weakening unnecessary scattered light to the optical imaging system when contacting the ridges of the finger. Meanwhile, in a chamber formed by a valley of the finger and the film, since the reflection and scattering of the light in the chamber may enhance the brightness, when the light is reflected and scattered back to the sensing element through the finger, a clear fingerprint pattern is transmitted to a sensing element of the optical imaging system, thereby enhancing the difference of the brightness and darkness of the fingerprint pattern.

For the substrate for fingerprint contact in an embodiment of the disclosure, a light incident angle and a light emergent angle of the substrate do not need to be adjusted accurately in the assembly, and only a focal length between the substrate and the optical imaging system is required to be determined. Therefore, the assembly of the optical fingerprint recognition system is more convenient.

In conclusion, in the embodiment of the disclosure, the substrate for fingerprint contact is capable of enhancing the scattering of the light toward the finger through the hazed surface, improving the brightness of the valley, and meanwhile weakening the unnecessary scattered light to the optical imaging system after the light is transmitted and contacts the ridges of the finger. In this manner, when the light is reflected from the finger to the optical imaging system, through the total reflection and scattering caused by the light passing through the substrate, the optical imaging system is capable of capturing a fingerprint pattern with a sharp contrast between the brightness and darkness. In other words, the hazed substrate repairs the fuzzy part of the image in the sensing element during the capturing of the light, and solves the problem of a shadow generated when the optical imaging system captures the light reflection of itself, so as to enhance the difference of the brightness and darkness of the image of the fingerprint pattern. Therefore, the sensing element is capable of capturing a clearer fingerprint pattern. Meanwhile, the assembly of the substrate is much more convenient. Therefore, the disclosure solves the problems of fuzzy image and complex assembly when the conventional optical fingerprint recognition system captures the fingerprint pattern of the finger.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Figure 1:
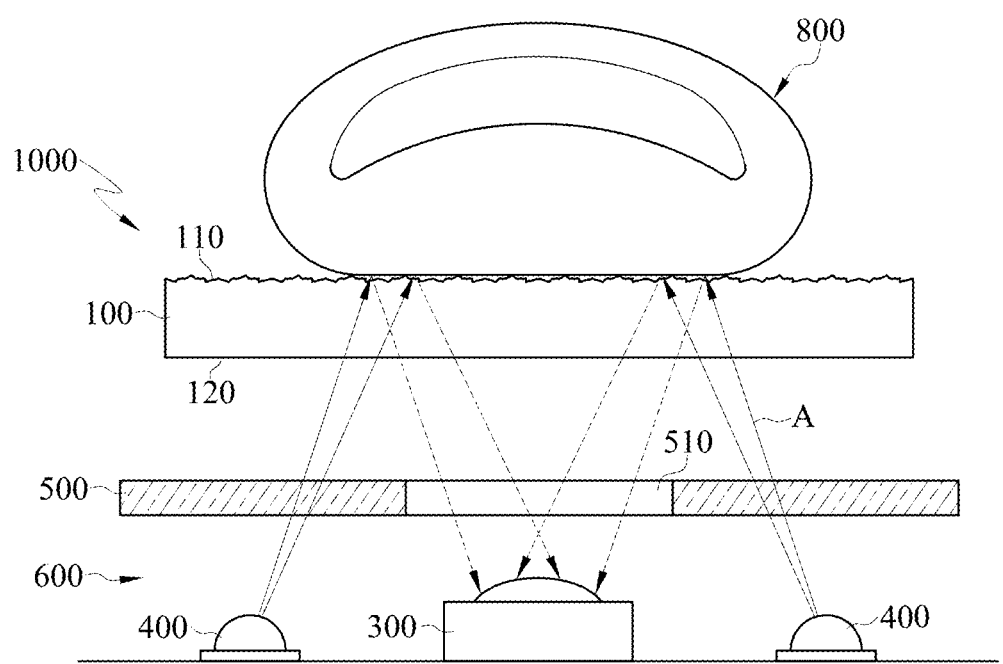
FIG. 1 is an overall structural view of a substrate for fingerprint contact according to an embodiment of the disclosure.

FIG. 1 is an overall structural view of a substrate for fingerprint contact according to an embodiment of the disclosure. In the embodiment shown in FIG. 1, a substrate 1000 includes a plate 100, and the plate 100 has a first surface 110 and a second surface 120. The first surface 110 is opposite to the second surface 120. The first surface 110 is an optical diffusing surface used for being contacted by a finger 800, and the second surface 120 faces an optical imaging system 600.

In this embodiment and parts of other embodiments, the optical diffusing surface of the first surface 110 and the plate 100 are integrally formed.

In an embodiment of the disclosure, the optical imaging system 600 includes two light emitting elements 400 and a sensing element 300. The light emitting elements 400 are used for emitting light to the plate 100, and the sensing element 300 faces the plate 100 and the sensing element 300 is used for capturing a fingerprint pattern of the finger 800 transmitted by the light through the finger 800.

The number of the light emitting elements according to the embodiment of the disclosure is two, but is not intended to limit the number of the light emitting elements of the disclosure.

In an embodiment of the disclosure, the optical diffusing surface of the first surface 110 is a surface featuring hazed particles formed by a UV Coating or a mold discharging process, and the haze of the optical diffusing surface of the first surface 110 approximately ranges from 85% to 95%. When the light is emitted to the finger 800, the optical diffusing surface of the first surface 110 enhances the scattering of the light, so the light is evenly emitted to the finger 800. Meanwhile, after the light contacts the finger 800, the optical diffusing surface of the first surface 110 weakens unnecessary scattered light to the optical imaging system 600, and the clear light is transmitted to the sensing element 300.

In the disclosure, the haze is defined as a power percent obtained in a manner that a light flux that passes through a sample and deviates from an incident direction (at an angle greater than 2.5 degrees) is divided by a total light flux passing through the sample.

In an embodiment of the disclosure, the sensing element of the optical imaging system may be formed by a lens and a CCD element, or a lens and a Complementary Metal Oxide Semiconductor (CMOS) element, or a lens and a Contact Image Sensor (CIS).

In this embodiment and parts of other embodiments, the distance between the sensing element 300 and the plate 100 is adjusted according to the actual focal length between the sensing element 300 and the plate 100.

In an embodiment, the optical imaging system 600 further includes a diffusing plate 500 disposed between the light emitting element 400 and the plate 100. After the light penetrates the diffusing plate 500, the diffusing plate 500 may change the penetration route of the light and scatter the light, so the light is evenly emitted to the plate 100, and the fingerprint of the finger 800 receives the light evenly.

In an embodiment, the diffusing plate 500 has an opening 510 between the sensing element 300 and the plate 100, and the light reflected from the finger 800 is emitted to the sensing element 300 through the opening 510 rather than through the diffusing plate 500. In this manner, the fuzzy image captured by the sensing element 300 resulting from the refraction of the light passing through the diffusing plate 500 is alleviated. In addition, the light route shown in FIG. 1 is a light travelling route of an embodiment and is not intended to limit the disclosure. Other travelling routes can be used in other embodiments to achieve the objectives of the disclosure.

Figure 2:
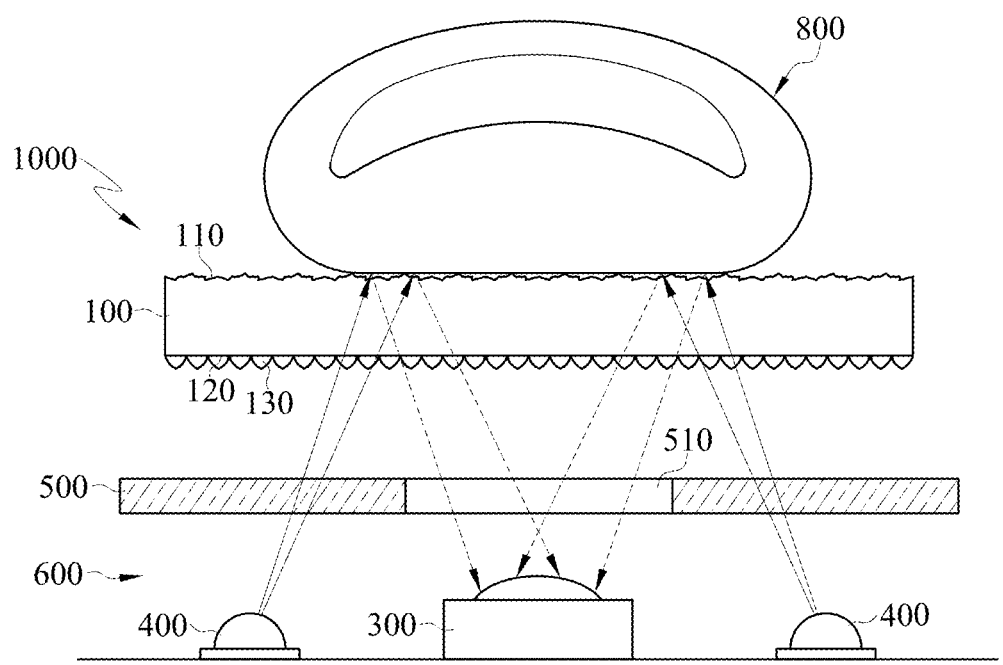
FIG. 2 is an overall structural view of the substrate for fingerprint contact according to an embodiment of the disclosure.

FIG. 2 is an overall structural view of the substrate for fingerprint contact according to an embodiment of the disclosure. The elements in FIG. 2 are similar to those in FIG. 1, and identical symbols represent the same or similar structures. As shown in FIG. 2, in an embodiment of the disclosure, the substrate 1000 further includes a microstructure 130 disposed on the second surface 120. The microstructure 130 is used for making the light evenly emitted to the plate 100 after passing through the microstructure 130.

In an embodiment and parts of other embodiments, when the light emitted by the light emitting element 400 passes through the diffusing plate 500, the light evenly covers the whole plate 500 through a special structure of the diffusing plate 500, so that the light emitted to the finger is even and concentrated. The light then passes through the microstructure 130 disposed on the second surface 120, and the microstructure 130 may also make the light evenly emitted to the plate 100. According to the principles of total reflection and scattering, when the light reaches the optical diffusing surface of the first surface 110 of the plate 100, the brightness of valleys is enhanced when the light is transmitted to the finger 800, and unnecessary scatted light is weakened after the light contacts ridges of the finger 800, so that the light is transmitted to the sensing element 300 through the opening 510, and the sensing element 300 is enabled to capture an image. In this manner, the substrate 1000 is capable of enhancing the fingerprint pattern of the finger 800 through the scattering effect, and improving the difference of the brightness and darkness of the fingerprint pattern. Therefore, a clearer fingerprint pattern is acquired.

In addition, the light travelling route shown in FIG. 2 is a light travelling route of an embodiment and is not intended to limit the disclosure. Other travelling routes can be used in other embodiments to achieve the objectives of the disclosure.

Figure 3:
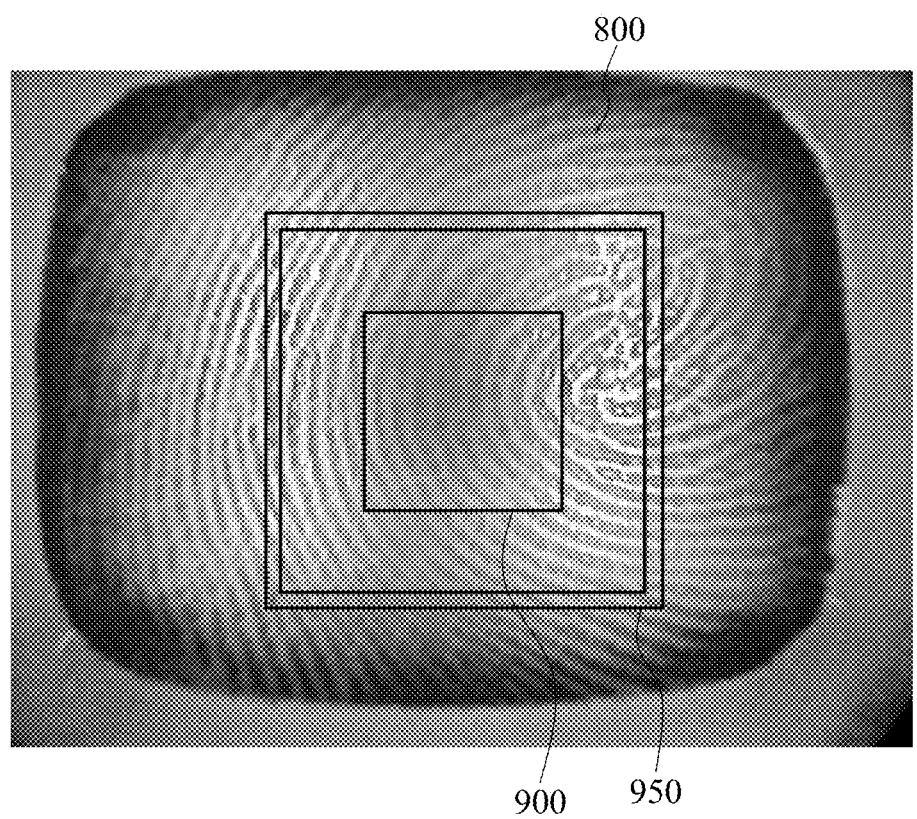
FIG. 3 is a view of a fingerprint image according to an embodiment of the disclosure.

FIG. 3 is a view of a fingerprint image according to an embodiment of the disclosure. As shown in FIG. 3, in a fingerprint recognition area 950 in FIG. 3, the image of the fingerprint pattern of the finger 800 in a CCD imaging area 900 is clear, and the image does not contain the reflection of the CCD imaging area 900 itself, thereby demonstrating the efficacy of the substrate for fingerprint contact according to the disclosure.

Figure 4:
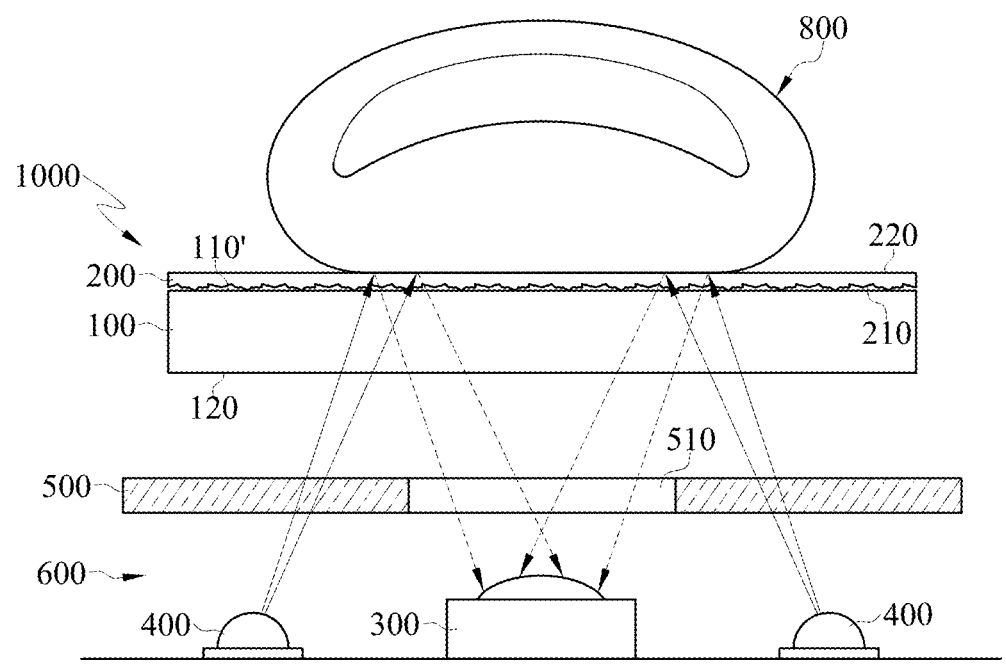
FIG. 4 is an overall structural view of the substrate for fingerprint contact according to an embodiment of the disclosure.

FIG. 4 is an overall structural view of the substrate for fingerprint contact according to an embodiment of the disclosure. The elements in FIG. 4 are similar to those in FIG. 1, and identical symbols represent the same or similar structures. As shown in FIG. 4, in an embodiment of the disclosure, the substrate for fingerprint contact 1000 includes a plate 100 and a film 200. The plate 100 has a first surface 110' and a second surface 120. The first surface 110' is opposite to the second surface 120, and the second surface 120 faces an optical imaging system 600. The film 200 has a third surface 210 and a fourth surface 220, and the third surface 210 is opposite to the fourth surface 220. The third surface 210 has an optical diffusing surface. The film 200 is attached to the first surface 110' of the plate 100 through the optical diffusing surface of the third surface 210. The optical diffusing surface of the third surface 210 is located between the plate 100 and the film 200, and the fourth surface 220 of the film 200 far away from the optical diffusing surface of the third surface 210 is used for being contacted by a finger 800. In other words, compared with the embodiments of FIG. 1 and FIG. 2, the plate in this embodiment is formed by two elements, namely, the plate 100 and the film 200, and the optical diffusing surface is on the film 200, rather than on the first surface 110' of the plate 100.

In this embodiment and parts of other embodiments, the optical imaging system 600 includes two light emitting elements 400 and a sensing element 300. The light emitting elements 400 of the optical imaging system 600 are used for emitting light to the plate 100, and the sensing element 300 faces the plate 100 and is used for capturing a fingerprint pattern of the finger 800 transmitted by the light through the finger 800.

The light emitting elements according to the embodiment of the disclosure are not intended to limit the number of the light emitting elements of the disclosure.

The light emitting elements according to the embodiment of the disclosure are described as Light Emitting Diodes (LEDs), but are not intended to limit the disclosure.

In an embodiment of the disclosure, the third surface 210 of the film 200 in the substrate 1000 features hazed particles formed by the UV Coating or the mold discharging process, and the haze of the third surface 210 of the film 200 approximately ranges from 85% to 95%. When the light is emitted to the finger 800, the hazed particles of the film 200 enhance the scattering of the light, so the light is evenly emitted to the finger 800. After the light contacts the finger 800, the hazed particles of the film 200 are capable of weakening unnecessary scattered light contacting the ridges of the finger 800 to transmit the clear fingerprint pattern of the finger 800 to the sensing element 300 through the light.

In this embodiment and parts of other embodiments, the optical imaging system 600 further includes a diffusing plate 500 located between the light emitting element 400 and the plate 100. The diffusing plate 500 is used for making the light evenly emitted to the plate 100 after passing through the diffusing plate 500, so the diffusing plate 500 enhances the fingerprint recognition rate effectively.

In an embodiment, the diffusing plate 500 has an opening 510 located between the sensing element 300 and the plate 100, so the light reflected from the finger 800 is emitted to the sensing element 300 through the opening 510 rather than through the diffusing plate 500. In this manner, the fuzzy image of the fingerprint resulting from the refraction of the light passing through the diffusing plate 500 is alleviated.

In an embodiment and parts of other embodiments, when the light emitted by the light emitting element 400 passes through the diffusing plate 500, the light evenly covers the whole plate 100 through a special structure of the diffusing plate 500, such that the light emitted to the finger is even and concentrated. According to the principles of refraction and scattering of the light, when the light enters the plate 100, the light penetrates the plate 100 and reaches the film 200, so the light becomes evenly distributed through the optical diffusing surface of the third surface 210 of the film 200. When the light is emitted to the fourth surface 220, as the ridges of the finger 800 directly contact the fourth surface 200, the light is reflected when contacting the ridges of the finger 800.

The optical diffusing surface of the third surface 210 of the film 200 weakens unnecessary scattered light to the optical imaging system 600, and the light is evenly distributed, to enhance the light emitted to the valleys of the finger 800 to improve the brightness of the light. According to the principles of total reflection and scattering of the light, the light is reflected by the finger 800, then penetrates the opening 510 and reaches the sensing element 300. In this manner, the substrate 1000 is capable of enhancing the fingerprint pattern of the finger 800, and improving the difference of the brightness and darkness through the scattering effect. Therefore, the fingerprint pattern is clearer.

Otherwise, the light travelling route shown in FIG. 4 is a light travelling route of an embodiment and is not intended to limit the disclosure. Other travelling routes can be used in other embodiments to achieve the objectives of the disclosure.

In conclusion, the efficacy of the disclosure is achieved through the optical diffusing surface of the substrate to make the light evenly scattered before being emitted to the finger. After the light contacts the finger, unnecessary scattered light is weakened, the light required by the optical imaging system is enhanced, and the difference of the brightness and darkness of the fingerprint is improved, so the problems that an image of the optical fingerprint recognition system is fuzzy, and the recognition becomes difficult when the optical imaging system captures an image reflected by itself are solved. Meanwhile, since the light incident angle and emergent angle of the substrate do not need to be adjusted accurately in the assembly of the optical fingerprint recognition system, and only the focal length between the substrate and the optical imaging system is required to be determined. Therefore, the assembly of the optical fingerprint recognition system is convenient.

What is claimed is:

1. A substrate for fingerprint contact, comprising:
a plate, wherein the plate has a first surface and a second surface, the first surface is opposite to the second surface, the first surface is an optical diffusing surface, the optical diffusing surface is used for being contacted by a finger, and the second surface faces an optical imaging system, the optical diffusing surface is a surface featuring hazed particles formed by a Ultra-Violet Coating (UV Coating) or a mold discharging process, and the haze of the optical diffusing surface ranges from 85% to 95%;
wherein the optical imaging system comprises at least one light emitting element, the light emitting element is used for emitting light to the plate, when the light emitting element transmits the light to the optical diffusing surface, the scattering of the light is enhanced, and when the light contacts the finger, the optical diffusing surface helps to weaken the scattering of the light.

2. The substrate for fingerprint contact according to claim 1, wherein the optical imaging system further comprises a sensing element, and the sensing element faces the plate and is used for capturing a fingerprint pattern of the finger transmitted by the light through the finger.

3. The substrate for fingerprint contact according to claim 2, further comprising a microstructure disposed on the second surface, wherein the microstructure is used for making the light evenly emitted to the plate after passing through the microstructure.

4. The substrate for fingerprint contact according to claim 2, wherein the optical imaging system further comprises a diffusing plate, disposed between the light emitting element and the plate, and used for making the light evenly emitted to the plate after passing through the diffusing plate.

5. A substrate for fingerprint contact, comprising:
a plate, having a first surface and a second surface, wherein the first surface is opposite to the second surface, and the second surface faces an optical imaging system; and
a film, having an optical diffusing surface, wherein the film is attached to the first surface of the plate through the optical diffusing surface so the optical diffusing surface is located between the plate and the film, and another surface of the film far away from the optical diffusing surface is used for being contacted by a finger;
wherein the optical diffusing surface is a surface featuring hazed particles formed by a Ultra-Violet Coating (UV Coating) or a mold discharging process, and the haze of the optical diffusing surface of the film ranges from 85% to 95%;
wherein the optical imaging system comprises at least one light emitting element, the light emitting element is used for emitting light to the plate, when the light emitting element transmits the light to the optical diffusing surface of the film, the scattering of the light is enhanced, and when the light contacts the finger, the optical diffusing surface helps to weaken the scattering of the light reflected by the finger.

6. The substrate for fingerprint contact according to claim 5, wherein the optical imaging system further comprises a sensing element, and the sensing element faces the plate and is used for capturing a fingerprint pattern of the finger transmitted by the light through the finger.

7. The substrate for fingerprint contact according to claim 6, wherein the optical imaging system further comprises a diffusing plate, disposed between the light emitting element and the plate, and used for making the light evenly emitted to the plate after passing through the diffusing plate.

8. A substrate for fingerprint contact, comprising:
a plate, wherein the plate has a first surface and a second surface, the first surface is opposite to the second surface, the first surface is an optical diffusing surface, the optical diffusing surface is used for being contacted by a finger, and the second surface faces an optical imaging system;
wherein the optical imaging system comprises at least one light emitting element and a diffusing plate, the diffusing plate is disposed between the light emitting element and the plate, and used for making the light evenly emitted to the plate after passing through the diffusing plate.

* * * * *